United States Patent
Chuang

(10) Patent No.: US 7,308,845 B2
(45) Date of Patent: Dec. 18, 2007

(54) SAWING ANGLE INDICATING-AND-READING DEVICE FOR A TABLE SAWING MACHINE

(76) Inventor: Bor-Yann Chuang, No. 78, Yungfeng Rd., Taiping City, Taichung (TW) 411

( * ) Notice: Subject to any disclaimer, the term of this patent is extended or adjusted under 35 U.S.C. 154(b) by 259 days.

(21) Appl. No.: 11/245,214

(22) Filed: Oct. 7, 2005

(65) Prior Publication Data

US 2007/0079680 A1   Apr. 12, 2007

(51) Int. Cl.
*B26D 7/27*   (2006.01)
(52) U.S. Cl. ............. 83/522.15; 83/477.2; 33/640
(58) Field of Classification Search ............. 83/522.15, 83/522.16, 522.11, 477.2, 471.2, 471.3, 472, 83/473, 477, 477.1; 33/640, 641, 628
See application file for complete search history.

(56) References Cited

U.S. PATENT DOCUMENTS

| | | | | |
|---|---|---|---|---|
| 4,641,557 A | * | 2/1987 | Steiner et al. | 83/471.3 |
| 4,754,276 A | * | 6/1988 | Carlson et al. | 83/522.18 |
| 6,858,858 B2 | * | 2/2005 | Pease | 250/559.19 |
| 7,066,069 B2 | * | 6/2006 | Ku et al. | 83/473 |
| 2006/0000329 A1 | * | 1/2006 | Terashima et al. | 83/471.3 |
| 2006/0000330 A1 | * | 1/2006 | Terashima et al. | 83/471.3 |
| 2006/0005676 A1 | * | 1/2006 | Terashima et al. | 83/471.3 |
| 2006/0230902 A1 | * | 10/2006 | Oberheim | 83/522.15 |

\* cited by examiner

*Primary Examiner*—Stephen Choi
(74) *Attorney, Agent, or Firm*—Ming Chow; Sinorica, LLC

(57) ABSTRACT

A sawing angle indicating-and-reading device for a table sawing machine includes a saw base, a driving connecting rod and an angle sensing device. The driving connecting rod is actuated to drive the saw base to shift bias for an angle. The angle sensing device is composed of an angular signal reading head and a circuit device. The angular signal reading head is firmly fitted on the inner end of the driving connecting rod to rotate together with the driving connecting rod for producing an angle increasing or decreasing signal and putting it out to the circuit device and simultaneously, the circuit device will put out a digital angular value. By so designing, the sawing angles of the table sawing machine can easily and accurately be read, able to elevate precision in sawing.

2 Claims, 4 Drawing Sheets

SAWING ANGLE INDICATING-AND-READING DEVICE FOR A TABLE SAWING MACHINE

BACKGROUND OF THE INVENTION

1. Field of the Invention

This invention relates to a sawing angle indicating-and-reading device for a table sawing machine, particularly to one able to accurately measure and indicate the deflecting angle of the saw base of a table sawing machine and re-correct the measured angular value.

2. Description of the Prior Art

A conventional table sawing machine, as shown in FIG. 1, includes a saw base 1, a driving connecting rod 2 and an angle indicating dial 3 installed at a preset location on the table sawing machine. The driving connecting rod 2 is actuated to drive the saw base 1 to shift bias for an angle, and the angle indicating dial 3 indicates a turned angle of the saw base 1.

However, the angle indicating dial 3 of the conventional table sawing machine indicates the turning angles of the saw base 1 in an analog graduated way; therefore, it is hard to accurately indicate the turned angle of the saw base, thus affecting precision in sawing.

SUMMARY OF THE INVENTION

The objective of the invention is to offer a sawing angle indicating-and-reading device for a table sawing machine, which is provided with an angular signal reading head, an angle sensing device and a circuit device. The angular signal reading head is firmly fitted with the inner end of a driving connecting rod to rotate together with the driving connecting rod for producing a signal and putting it out to the circuit device. By this signal, the increase or decrease in an angle of the angular signal reading head can be read, and the turned angle of the saw base can be accurately indicated on a digital indicator, able to elevate precision in sawing.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
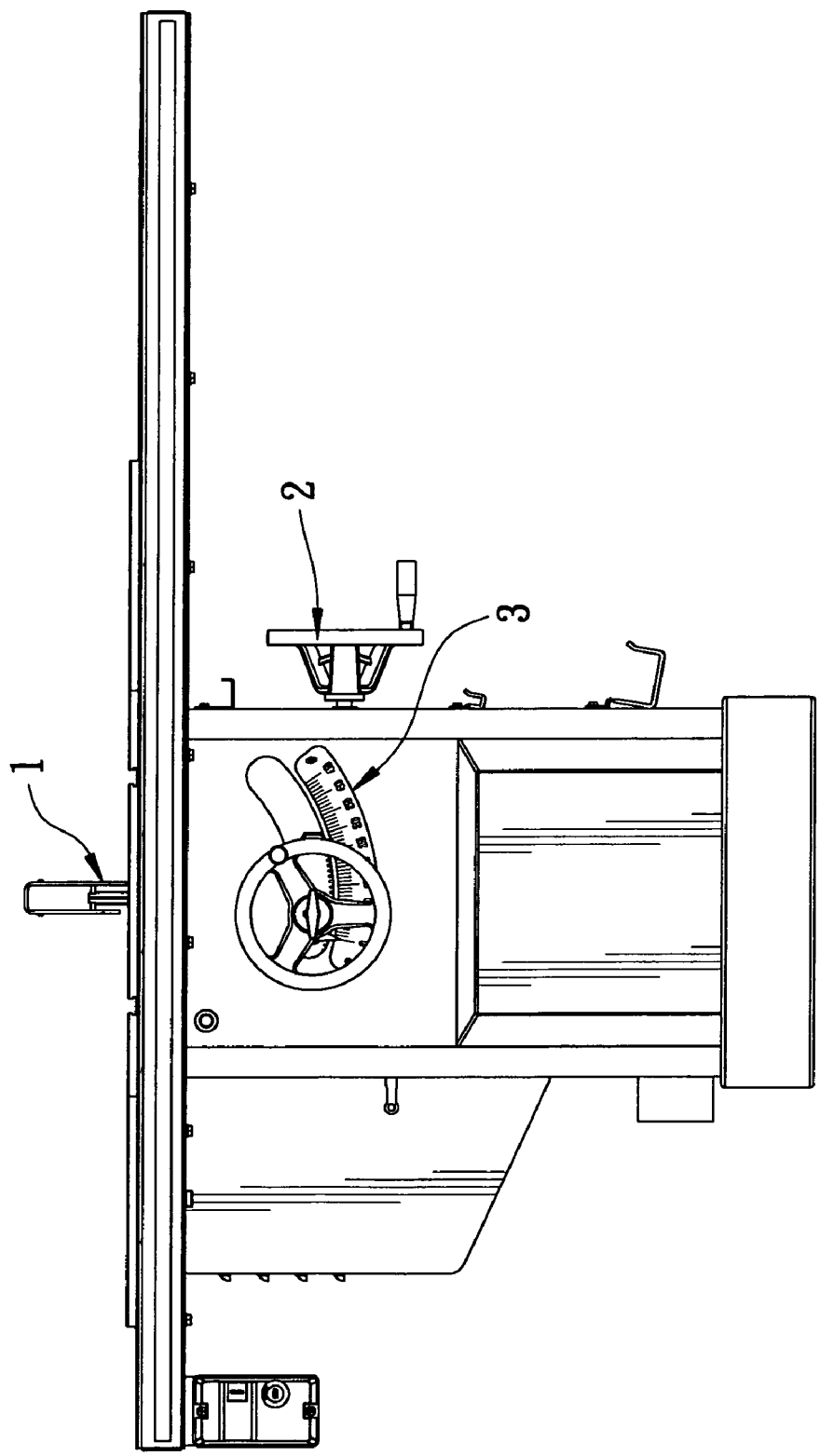
FIG. 1 is a side cross-sectional view of a conventional table sawing machine.
Figure 2:
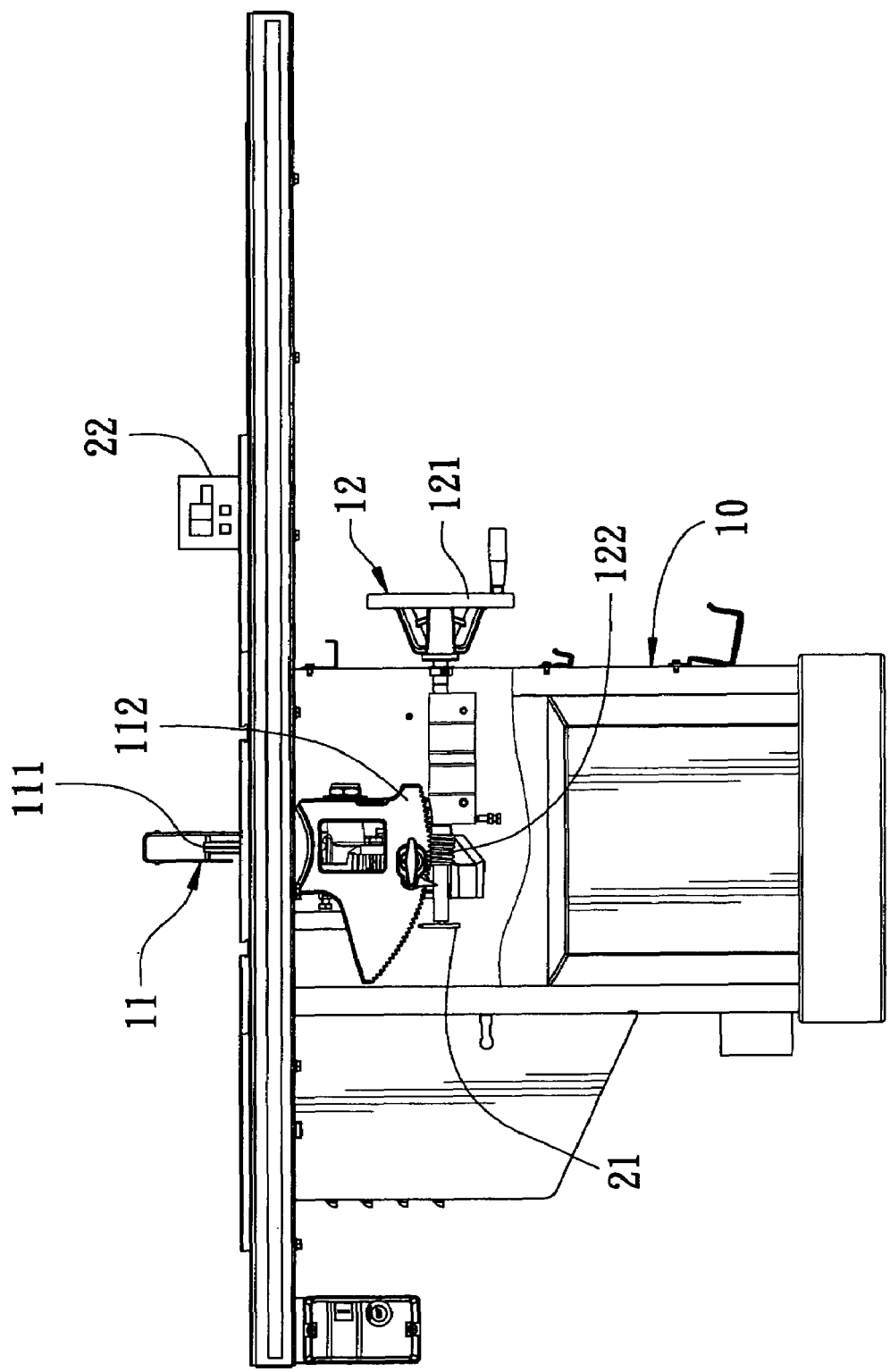
FIG. 2 is a side cross-sectional view of a table sawing machine in the present invention.
Figure 3:
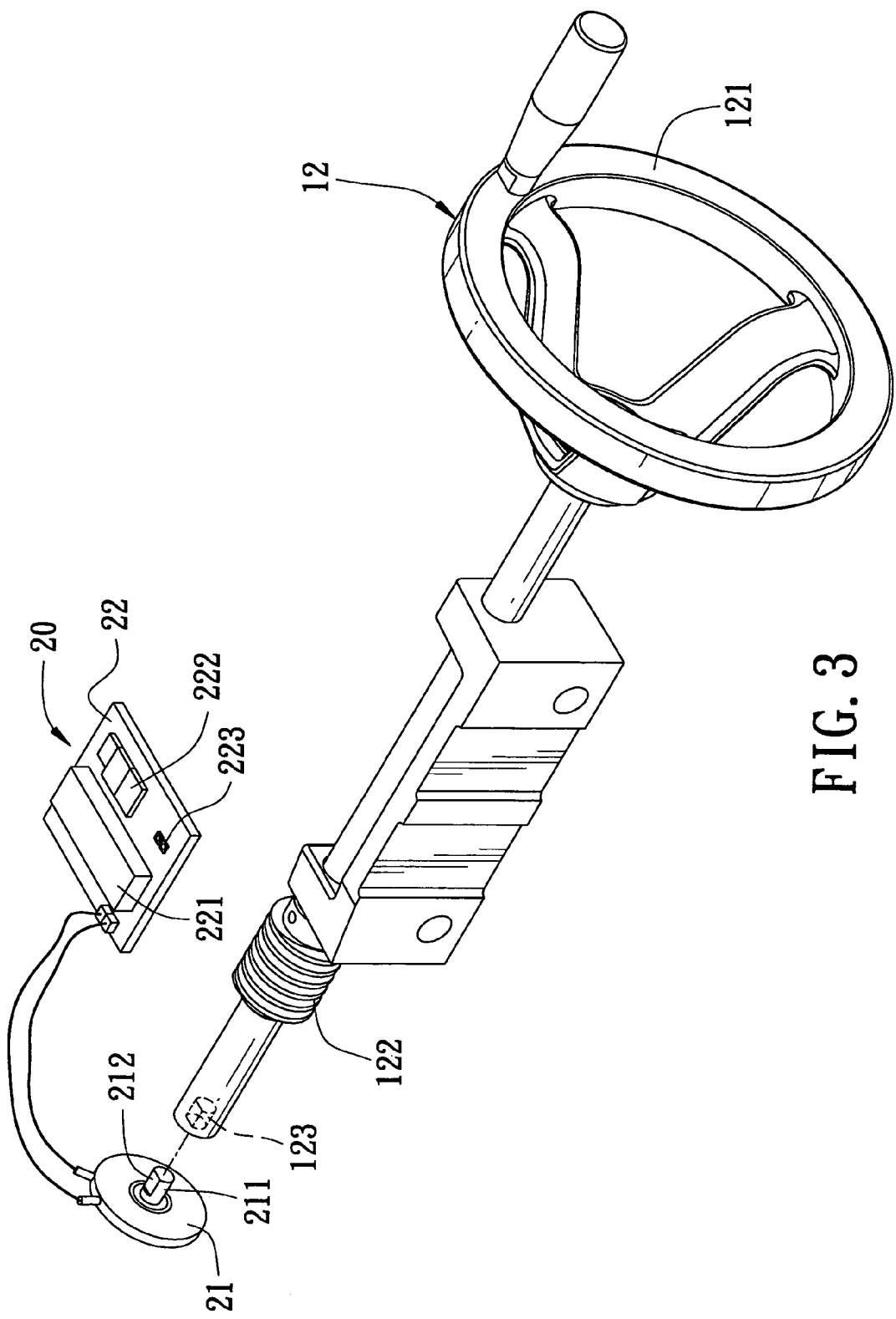
FIG. 3 is an exploded perspective view of an angle sensing device in the present invention.
Figure 4:
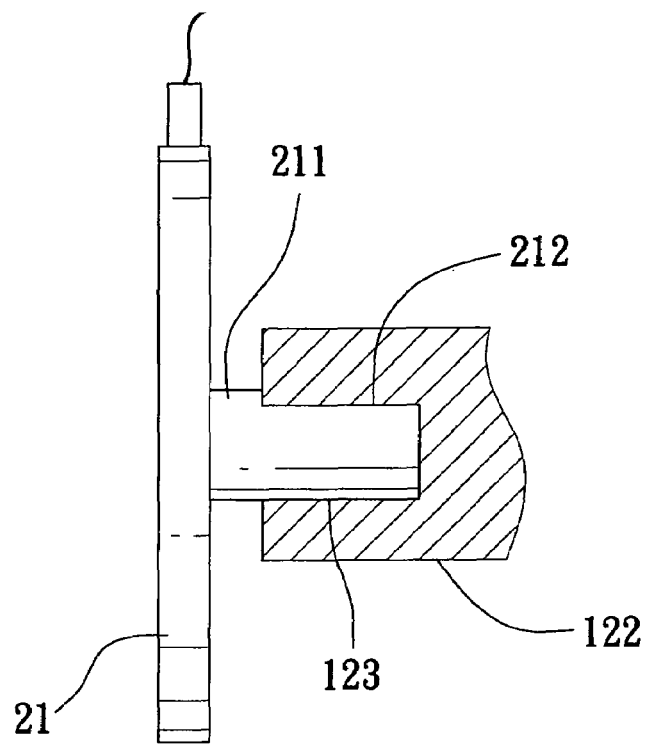
FIG. 4 is a side cross-sectional view of a worm fitted with an angular signal reading head in the present invention.

A preferred embodiment of a sawing angle indicating-and-reading device for a table sawing machine in the present invention, as shown in FIGS. 2, 3 and 4, includes a machine body 10, a saw base 11, a driving connecting rod 12 and an angle sensing device 20 combined together.

The machine body 10 is assembled thereon with the saw base 11 and the driving connecting rod 12.

The saw base 11 is mainly composed of a saw blade 111 and a sector gear 112. The saw blade 111 is actuated by the sector gear 112 to shift bias for an angle and carry out sawing.

The driving connecting rod 12 has its outer end connected with a hand-wheel 121 and its inner end fixed with a worm 122 engaging with the sector gear 112 of the saw base 11. The hand-wheel 121 can be freely turned for any angle for actuating the driving connecting rod 12 and the worm 122 to rotate and drive the sector gear 112 to shift bias for an angle.

The angle sensing device 20 consists of an angular signal reading head 21 and a circuit device 22. The angular signal reading head 21 positioned at a proper location on the machine body 10 is fixed with an insert post 211 extending outward from the center and having a level cut groove 212 provided at a preset location. The insert post 211 in this preferred embodiment is shaped as a column, but it could also be in other non-circular shapes. The driving connecting rod 12 has its inner end bored with an axial insert hole 123 having its shape matching with the insert post 211 of the angular signal reading head 21 so that the insert post 211 can be closely inserted in the insert hole 123 for firmly combining the angular signal reading head 21 together with the driving connecting rod 12. The driving connecting rod 12 is actuated to drive the angular signal reading head 21 to rotate and produce a signal value and simultaneously put out the signal to the circuit device 22. The circuit device 22 positioned at a proper location of the table sawing machine is composed of a micro-chip unit 221, a digital indicator 223 and a set switch 223. The microchip unit 221 functions to receive the signal value input by the angular signal reading head 21 and put it out to the digital indicator 222 whose smallest indicating angle is 0.1°. The set switch 223 functions to reset a proportional value between the signal sensed by the angular signal reading head 21 and the angle of the saw base 11 to enable the table sawing machine to carry out correction anew.

Figure 5:
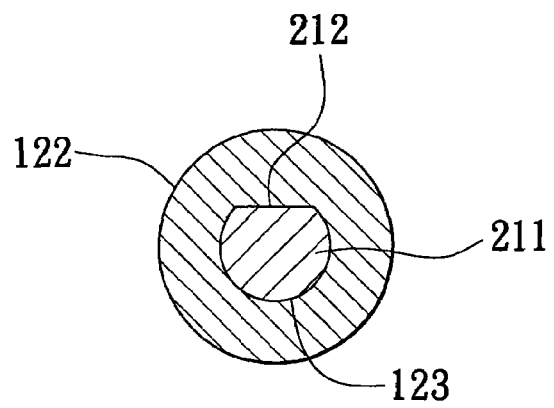
FIG. 5 is a front view of the worm fitted with the angular signal reading head in the present invention.

To adjust the angles of the saw base 11 of the table sawing machine, as shown in FIGS. 3, 4 and 5, firstly, the driving connecting rod 12 together with the worm 122 is turned to drive the sector gear 112 to rotate and actuate the saw base 11 to shift bias for an angle. Simultaneously, the angular signal reading head 21 is actuated by the driving connecting rod 12 to rotate and produce an advancing or retreating signal and put it out to the microchip unit 221 of the circuit device 22. Meanwhile, the microchip unit 221 converts the signal put in by the angular signal reading head 21 into an angular value of the slanting saw base 11 and puts out the angular value to the digital indicator 222. At the same time, the set switch 223 resets a proportional value between the signal of the angular signal reading head 21 and the angle of the saw base 11 for re-correcting the table sawing machine to avoid errors produced between the signal value of the angular signal reading head 21 and the angle of the saw base 11.

By so designing, the angle of the saw base of the table sawing machine can be directly observed through the digital indicator on the circuit device, needless to measure the sawing angle with eyes, avoiding errors in measuring and elevating precision in sawing.

While the preferred embodiment of the invention has been described above, it will be recognized and understood that various modifications may be made therein and the appended claims are intended to cover all such modifications that may fall within the spirit and scope of the invention.

I claim:

1. A sawing angle reading-and-indicating device for a table sawing machine comprising a saw base and a driving connecting rod, said driving connecting rod turned to actuate a worm to rotate, said worm on said driving connecting rod rotated to actuate a sector gear on said saw base to rotate, said sector gear actuating said saw base to shift bias for an angle within a preset range; and, Characterized by an angle sensing device composed of an angular signal reading head and a circuit device, said angular signal reading head fitted on an inner end of said driving connecting rod, said angular signal reading head actuated to rotate together with said driving connecting rod and produce an advancing or retreating signal and put it out to said circuit device, said circuit device composed of a microchip unit, a digital indicator and a set switch, said signal produced by said angular signal reading head being put in said micro-chip unit and converted into an angular value of said saw base, said angular value of said saw base indicated on said digital indicator, said set switch functioning to reset and re-correct a proportional value between said signal output by said angular signal reading head and the angle of said saw base.

2. The sawing angle reading-and-indicating device for a table sawing machine as claimed in claim 1, wherein said angular signal reading head is fixed at a preset location of the table sawing machine and provided with a non-circular insert post extending outward from the center, said driving connecting rod having its inner end bored with an insert hole to be fitted with said insert post of said angular signal reading head.

* * * * *